(12) United States Patent
Lu (10) Patent No.: US 10,019,105 B2
(45) Date of Patent: Jul. 10, 2018

(54) DISPLAY PANEL AND TOUCH-CONTROL FORCE DETECTION METHOD

(71) Applicants: Shanghai Tianma Micro-electronics Co., Ltd., Shanghai (CN); Tianma Micro-electronics Co., Ltd., Shenzhen (CN)

(72) Inventor: Feng Lu, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 185 days.

(21) Appl. No.: 15/264,172

(22) Filed: Sep. 13, 2016

(65) Prior Publication Data

US 2017/0003811 A1     Jan. 5, 2017

(30) Foreign Application Priority Data

Jun. 20, 2016    (CN) ........................... 2016-10443413

(51) Int. Cl.
    *G06F 3/041*       (2006.01)
    *G06F 3/044*       (2006.01)

(52) U.S. Cl.
    CPC ............ *G06F 3/0416* (2013.01); *G06F 3/044* (2013.01); *G06F 3/0412* (2013.01); *G06F 3/0414* (2013.01); *G06F 2203/04105* (2013.01); *G06F 2203/04106* (2013.01); *G06F 2203/04111* (2013.01)

(58) Field of Classification Search
None
See application file for complete search history.

(56) References Cited

U.S. PATENT DOCUMENTS

2016/0048266 A1*   2/2016   Smith .................. G06F 3/0418
                                                                    345/174

FOREIGN PATENT DOCUMENTS

CN            101727863 A     6/2010

\* cited by examiner

*Primary Examiner* — Gustavo Polo
(74) *Attorney, Agent, or Firm* — Anova Law Group, PLLC (57) ABSTRACT

A display panel and a touch-control force detection method are provided. The display panel comprises a display area, a non-display area surrounding the display area, and a plurality of bridge-type strain sensors disposed in the non-display area of the display panel. The bridge-type strain sensor comprises a first output terminal electrically connected to a first common output line, a second output terminal electrically connected to a second common output line, a first input terminal electrically connected to a first power supply voltage, a second input terminal electrically connected to a second power supply voltage, and a first switch unit.

13 Claims, 7 Drawing Sheets

DISPLAY PANEL AND TOUCH-CONTROL FORCE DETECTION METHOD

CROSS-REFERENCES TO RELATED APPLICATIONS

This application claims priority of Chinese Patent Application No. 201610443413.6, filed on Jun. 20, 2016, the entire contents of which are hereby incorporated by reference.

FIELD OF THE INVENTION

The present disclosure generally relates to the field of electronic display technology and, more particularly, relates to a display panel and a touch-control force detection method.

BACKGROUND

A variety of electronic devices, such as laptops, tablets, mobile communication devices, and TVs, etc., provide a touch-control screen for user input. When a user touches a touch-control screen in an electronic device using a finger, the touch-control screen sends a signal to the electronic device. In many touch-control screens, resistive force sensors are used to detect a touch-control force. The resistive force sensors are relatively cheap, and may be used in different types of display panels, such as Twisted Nematic (TN) panels, Vertical Alignment (VA) panels, In-Plane Switching (IPS) panels, and Low Temperature Poly-silicon Liquid Crystal Display (LTPS LCD) panels, etc.

Bridge-type strain sensors can calculate a touch-control force by detecting in-plane deformation induced by a strain along the Z direction and measuring the change in the resistance of sensors. Further, to avoid impacting the display quality, the bridge-type strain sensors can be disposed in the non-display area of a display panel. Because it is not possible to directly fabricate a voltage comparator in the display panel, two signal lines are needed for each sensor, resulting in an excessive number of wirings, which is against the trend of using narrow frames in current electronic devices.

Accordingly, a new display panel and touch-control force detection method is required. The disclosed display panel and touch-control force detection method are directed to solve one or more problems set forth above and other problems.

The above information disclosed in this background section is only for enhancement of understanding of the background of the invention and therefore it may contain information that does not form the prior art that is already known to a person of ordinary skill in the art.

BRIEF SUMMARY OF THE DISCLOSURE

One aspect of the present disclosure provides a display panel. The display panel comprises a display area, a non-display area surrounding the display area, and a plurality of bridge-type strain sensors disposed in the non-display area of the display panel. The bridge-type strain sensor comprises a first output terminal electrically connected to a first common output line, a second output terminal electrically connected to a second common output line, a first input terminal electrically connected to a first power supply voltage, a second input terminal electrically connected to a second power supply voltage, and a first switch unit. A first end, a second end, a third end, and a fourth end of the first switch unit are electrically connected to the first output terminal, the second output terminal, the first common output line, and the second common output line, respectively, and a first control terminal of the first switch unit receives a first control signal to control switch-on and switch-off of the first output terminal and the second output terminal.

Another aspect of the present disclosure provides a touch-control force detection method used in the display panel. The touch-control force detection method comprises reading an initial trigger signal of each display frame in the display panel; reading an output signal in the first common output line and the second common output line according to an established sequence to obtain an output signal of each bridge-type strain sensor; and calculating a touch-control force via the output signal of corresponding bridge-type strain sensors and the detected touch-control location in the display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

As discussed above, in display panels, it may not be possible to directly fabricate a voltage comparator. Accordingly, two signal lines may be needed for each strain sensor, resulting in an excessive number of wirings, which is against the trend of using narrow frames in current electronic devices.

The present disclosure provides an improved display panel and an improved touch-control force detection method. The disclosed display panel and touch-control force detection method may improve sensitivity in detecting a touch-control force, and reduce a number of wirings desired for strain sensors, thus decreasing frame widths of display screens.

Figure 1:
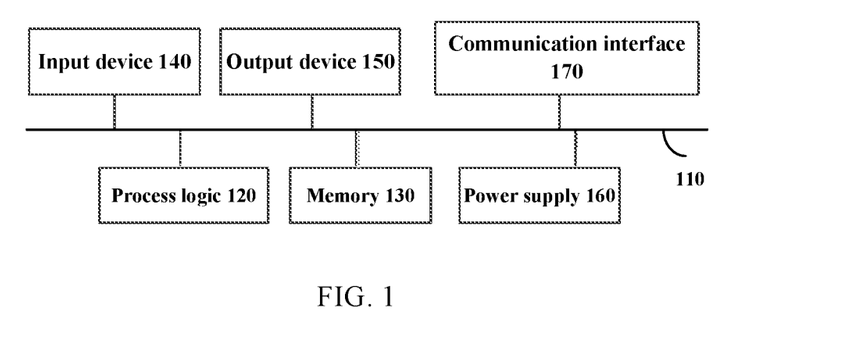
FIG. 1 illustrates an exemplary mobile communication device with a display panel or method consistent with disclosed embodiments.

FIG. 1 illustrates an exemplary mobile communication device with a disclosed display panel or method. As shown in FIG. 1, a mobile communication device 100 may include a display panel. The display panel may be a touch-sensing display panel or a touch-control screen, and the touch-sensing display panel or the touch-control screen may be configured to receive user input information when a user touches the display panel or the screen.

For example, the user may directly input information into the display panel using a finger or via other input tools like a stylus. The user input information received via the disclosed display panel may be processed using an operational component or a device in the mobile communication device 100. The touch display panel may allow an interaction between a user and the mobile communication device 100 and, accordingly, the mobile communication device 100 may execute one or more operations. In one embodiment, the display panel may include a liquid crystal display (LCD) device.

The touch-sensing display panel or touch-control screen may respond to a capacitance induced by a user's finger. A capacitive touch-sensing display panel (or display device) may include a first layer disposed along an X direction and a second layer disposed along a Y direction. When a user touches the display panel, the first layer and the second layer may simultaneously provide "x" and "y" coordinates for the user's finger on the touch-sensing display panel.

The disclosed display panel or method may measure a force applied by the user's finger. A bridge-type strain sensor may measure a resistance change induced by a strain of an applied mechanical force. Compared to other materials, silicon may show an extremely large piezoresistive response. For example, the piezoresistive response of silicon may be around 100 times of a piezoresistive response of common metals. A change in resistance may not be induced by geometric factors and, thus, may not need to rely on changes in length and area. Accordingly, together with unused areas in a silicon substrate disposed in the display panel, the disclosed display panel and/or method can form the disclosed bridge-type strain sensors for sensing a force applied by the user's finger on the display panel. The additional cost of the bridge-type strain sensors implemented in unused silicon of the display panel may be negligible because silicon already exists and no extra space is further required.

As shown in FIG. 1, the mobile communication device may include a bus 110, a process logic 120, a memory 130, an input device 140, an output device 150, a power supply 160, and a communication interface 170. The mobile communication device 100 may be configured using many methods, and may include other units. For example, the mobile communication device 100 may include one or more modulators, demodulators, encoders, and decoders, etc., to process data.

The process logic 120 may include one or more processors, micro-processors, application specific integrated circuit (ASIC), and Field-Programmable Gate Array (FPGA), etc. In one embodiment, the process logic 120 may include logics for controlling the display panel. For example, the process logic 120 may determine whether the user inputs information to the touch-control screen in the display panel.

The input device 140 may include a mechanism that allows the user to input information to the mobile communication device. For example, the mechanism may be a microphone, a touch-control screen display panel, a control button, a small keyboard, a keyboard, a pen, a speech recognition mechanism, and/or a biological recognition mechanism. Further, an entire or partial display panel may input information into a touch-control screen input device in the mobile communication device 100. Some devices may include a touch sensor integrated or combined with a display screen, and the touch sensor may allow the user to directly interact with user interface units displayed on the display screen.

The input device 140 may include one or more bridge-type strain sensors arranged in, for example, a sensor array. When the input device 140 is the touch-control screen display panel, the display panel may include the sensor array that covers partial or an entire area of the disclosed display panel. In some embodiments, the input device 140 may be an integrated part of the display panel. In some other embodiments, the input device 140 may be separated from the display panel.

Figure 2:
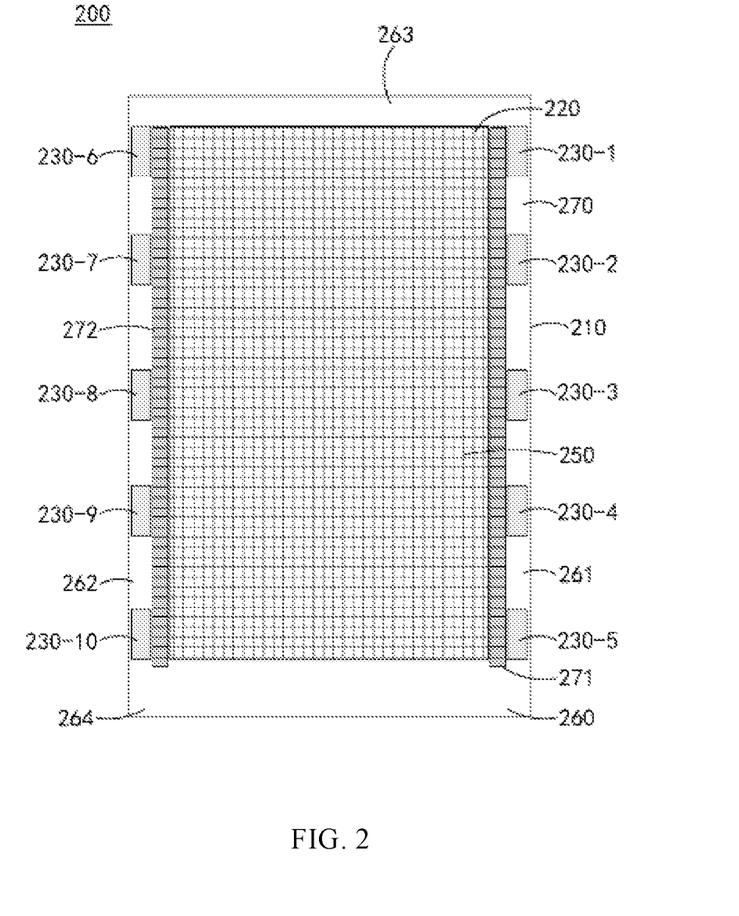
FIG. 2 illustrates an exemplary display panel in a mobile communication device consistent with disclosed embodiments.

FIG. 2 illustrates an exemplary display panel in a mobile communication device. As shown in FIG. 2, a display panel 200 may include a substrate 210 and a pixel array 220 disposed on the substrate 210. The substrate 210 may include a glass substrate coated with a silicon layer. For example, the substrate 210 may be a silicon-on-insulator (SOI) substrate, or a polymeric substrate having a conductive polymeric top layer.

The pixel array 220 may include white pixels, or colored pixels. For colored pixels, each pixel may include one or more sub-pixels, for example, red sub-pixels, green sub-pixels, or blue sub-pixels. Sub-pixels may be arranged in any pattern, such as a triangular arrangement, a stripe arrangement, or a diagonal arrangement.

As shown in FIG. 2, the display panel 200 may include a display area 250 and a non-display area 260 surrounding the display area 250. The pixel array 220 may be disposed in the display area 250. The non-display area 260 may include a first sub-area 261, a second sub-area 262, a third sub-area 263, and a fourth sub-area 264. Specifically, the first sub-area 261 may be on the right side of the display area 250, the second sub-area 262 may be on the left side of the display area 250, the third sub-area 263 may be on the upper side of the display area 250, and the fourth sub-area 264 may be on the lower side of the display area 250.

A plurality of bridge-type strain sensors 230 (from 230-1 to 230-10, as shown in FIG. 2) may be disposed in the non-display area 260, for example, the unused silicon area. Wires (not shown) may be used to connect to rows and columns of the pixel array 220, and may be disposed on top of the silicon layer. Wires installed for the bridge-type strain sensors 230 may be arranged together with the wires that connect pixel array 220. The wires for the bridge-type strain sensors 230 may be disposed in a metal layer or an indium tin oxide (ITO) layer near the edge of the disclosed display panel 200.

FIG. 2 illustrates the arrangement of ten bridge-type strain sensors 230. The number of the bridge-type strain sensors is only for illustrative purpose, and is not intended to limit the scope of the present disclosure. The bridge-type strain sensors 230 may be arranged on two sides (left and right) of the pixel array 220. For example, as shown in FIG. 2, a plurality of bridge-type strain sensors, from 230-1 to 230-5, may be disposed in the first sub-area 261 of the non-display area 260, and a plurality of bridge-type strain sensors, from 230-6 to 230-10, may be disposed in the second sub-area 262 of the non-display area 260. Further, the plurality of bridge-type strain sensors 230 may detect a deformation of the substrate 210 along the X direction and a deformation of the substrate 210 along the Y direction. By disposing the bridge-type strain sensors in the non-display area of the display panel, related circuits in the display area and the display effect of the display panel may not be influenced.

In one embodiment, the display panel 200 may include gate electrode lines (not shown) arranged along a first direction, data lines (not shown) along a second direction, pixel units (not shown), and a Gate-In-Panel (GIP) driving circuit 270. The pixel units may be defined by the intersected gate electrode lines and the data lines. The GIP driving circuit 270 may include a plurality of gate electrode driving units, from 1st to nth, and each gate electrode driving unit may include an output terminal that is electrically connected to the gate electrode line. A shift register function of the GIP circuit may realize a scanning operation mode of the bridge-type strain sensors. According to gate electrode scanning signals during display of the display panel, output signals of each sensor may be read out, thus greatly reducing the number of wirings without increasing the frame width of the display panel.

The GIP technology is often used in fabrication processes to reduce the production cost of display devices with narrow frames. In the GIP technology, a gate electrode driving circuit, namely, a GIP circuit, may be directly integrated into the display panel. The display panel often includes a display area to display images and a non-display area surrounding the display area. The gate electrode driving circuit may be disposed in the non-display area. The GIP technology may save scanning chips, reduce material cost, decrease the number of processes, and shorten the processing time, thus decreasing the cost of fabricating liquid crystal panels with narrow frames.

The display panel may include a plurality of pixels arranged in arrays, a plurality of gate electrode lines, and a plurality of gate electrode driving circuits. The gate electrode driving circuits may be used to produce multilevel GIP signals. The first level GIP signal may be delivered to gate electrode lines of first row of pixels, the second level GIP signal may be delivered to gate electrode lines of second row of pixels, and, similarly, the nth level GIP signal may be delivered to gate electrode lines of nth row of pixels. Specifically, according to the GIP signals provided by the gate electrode lines, the plurality of pixels in the display panel 100 may be selectively switched on.

The gate electrode driving circuit 270 may include a first part 271 and a second part 272. The first part 271 of the gate electrode driving circuit 270 may be disposed in the first sub-area 261 of the non-display area 260, and the second part 272 of the gate electrode driving circuit 270 may be disposed in the second sub-area 262 of the non-display area 260.

The gate electrode driving circuit 270 may be disposed in an area defined by the two sides (left and right) of the pixel array 220 and the plurality of bridge-type strain sensors 230. As shown in FIG. 2, one side of the first part 271 in the gate electrode driving circuit 270 may be disposed next to the right side of the pixel array 220, and the other side of the first part 271 may be closely disposed next to the left sides of the plurality of bridge-type strain sensors, from 230-1 to 230-5. One side of the second part 272 in the gate electrode driving circuit 270 may be disposed next to the left side of the pixel array 220, and the other side of the second part 272 may be closely disposed next to the right sides of the plurality of bridge-type strain sensors, from 230-6 to 230-10.

In some embodiments, the gate electrode driving circuit 270 may be disposed on the outside of the bridge-type strain sensors 230. That is, the bridge-type strain sensors 230 may be disposed between the gate electrode driving circuit 270 and the pixel array 220. In some embodiments, the gate electrode driving circuit 270 and bridge-type strain sensors 230 may all be disposed in the non-display area of the display panel, and the display effect of the touch-control display panel may not be influenced. The gate electrode driving circuit 270 and the bridge-type strain sensors 230 may be disposed close to each other, further reducing the frame width of the display panel.

Figure 3:
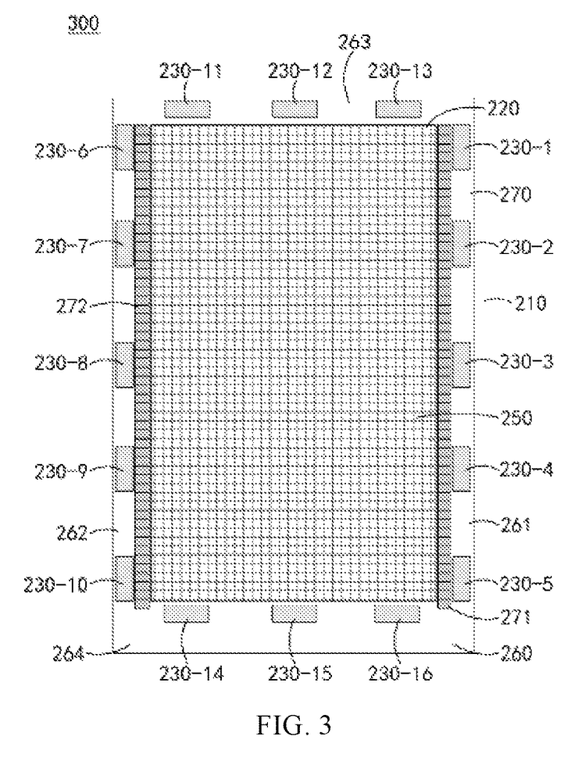
FIG. 3 illustrates another exemplary display panel in a mobile communication device consistent with disclosed embodiments.

FIG. 3 illustrates an exemplary display panel in a mobile communication device. As shown in FIG. 3, the display panel 300 may further include a plurality of bridge-type strain sensors, from 230-11 to 230-16. Specifically, bridge-type strain sensors, from 230-11 to 230-13 may be disposed in a third sub-area 263 of the non-display area 260, and a plurality of bridge-type strain sensors, from 230-14 to 230-16, may be disposed in a fourth sub-area 264 of the non-display area 260.

In some embodiments, each corner of the display panel 200 or 300 may have a bridge-type strain sensor (not shown), and a process logic 120 may, according to forces measured by the bridge-type strain sensors, calculate the force applied by the user's finger on a touch-control location. In some other embodiments, when the touch-control location is provided by capacitive sensors in the display panel, a force measurement may be a single channel measurement.

Factors that influence the arrangement of bridge-type strain sensors on the substrate may include existence of other components in the display panel, sensitivity of sensors, whether sensor calibration is required, and specific applications possibly using the sensors.

The ten or sixteen bridge-type strain sensors as illustrated in FIG. 2 or FIG. 3 are merely illustrative, the display panel may also include any number of bridge-type strain sensors arranged along the periphery. For example, an LCD display panel may include a top polarization filter and a black filter. The top polarization filter may be configured to polarize lights that leave the LCD display panel, and the black filter may block lights that do not pass a colored filter. Further, a LCD display panel may also include a top ITO electrode layer and a liquid crystal layer. The liquid crystal layer may respond to a voltage applied between a top electrode and a bottom electrode. The bottom electrode may be disposed in a silicon layer, and the silicon layer may include a thin film transistor (TFT) used to drive pixels and storage capacitors.

One row or one column of pixels (i.e., the pixel array 220) may be disposed near an edge of the LCD display panel, and may include a sealing component. The bridge-type strain sensors may be disposed in part of the silicon layer that is outside of the sealing component and has not been used in the LCD display panel. In other embodiments, the bridge-type strain sensors may be disposed in an area sealed by the sealing component.

Figure 4:
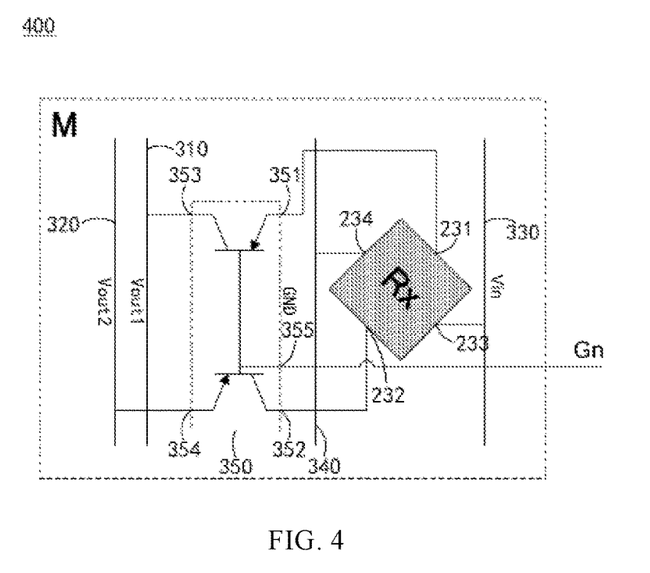
FIG. 4 illustrates an exemplary type of bridge-type strain sensors in a display panel included in a mobile communication device in FIG. 1 consistent with disclosed embodiments.

FIG. 4 illustrates an exemplary bridge-type strain sensor in a display panel included in a mobile communication device. As shown in FIG. 4, a bridge-type strain sensor 400 may include a first output terminal 231, a second output terminal 232, a first input terminal 233, a second input terminal 234, and a first switch unit 350. The first output terminal 231 may be electrically connected to a first common output line 310, the second output terminal 232 may be electrically connected to a second common output line 320, the first input terminal 233 may be electrically connected to a first power supply voltage 330, and the second input terminal 234 may be electrically connected to a second power supply voltage 340. A first terminal 351, a second terminal 352, a third terminal 353, and a fourth terminal 354 of the first switch unit 350 may be electrically connected to the first output terminal 231, the second output terminal 232, the first common output line 310, and the second common output line 320, respectively. A first control terminal 355 of the first switch unit 350 may receive a first control signal Gn to control the switch-on and switch-off of the first output terminal 231 and the second output terminal 232.

In one embodiment, the first power supply voltage 330 may be a positive power supply voltage Vin, and the second power supply voltage 340 may be a ground voltage (GND).

In one embodiment, the bridge-type strain sensor may be a silicon-based MEMS strain sensor, i.e., a diffusion-type bridge. The material of the strain sensor may be metal, alloy or semiconductor material. For example, silicon-based (poly-Si or A-Si) X-type MEMS strain sensors may be fabricated on one side of a substrate.

Specifically, the diffusion-type bridge may be a MEMS device with four terminals. The MEMS device may be made of single-silicon, poly-silicon, and non-silicon thin films. The four terminals may include a pair of input terminals and a pair of output terminals perpendicular to each other. In operation, an input voltage may be applied between the two input terminals, and the voltage difference between two output terminals may be an output signal. The output signal of the device may correspond to the planar shear stress applied on the thin film and, accordingly, the device may be used to detect a perpendicular force applied on the substrate.

Figure 5:
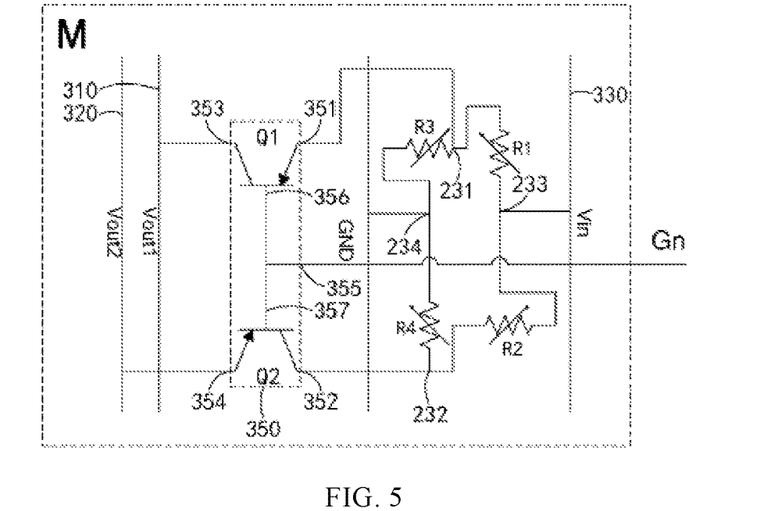
FIG. 5 illustrates another exemplary type of bridge-type strain sensors in a display panel included in a mobile communication device in FIG. 1 consistent with disclosed embodiments.

FIG. 5 illustrates another exemplary bridge-type strain sensor in a display panel included in a mobile communication device. As shown in FIG. 5, the bridge-type strain sensor may be a Wheatstone bridge. The Wheatstone bridge may include a first resistor R1, a second resistor R2, a third resistor R3, and a fourth resistor R4. The first resistor R1 and the second resistor R2 may be connected at the first input terminal 233, the third resistor R3 and the fourth resistor R4 may be connected at the second input terminal 234, the first resistor R1 and the third resistor R3 may be connected at the first output terminal 231, and the second resistor R2 and the fourth resistor R4 may be connected at the second output terminal 232.

In one embodiment, the first resistor R1, the second resistor R2, the third resistor R3, and the fourth resistor R4 may all be variable resistors that may be influenced by a strain. A signal from the Wheatstone bridge may be amplified via an analogue amplifier, and the analogue amplifier may be integrated into the unused silicon area of the display panel. In another embodiment, the first resistor R1 and the fourth resistor R4 may show the same resistance change rate, and the second resistor R2 and the third resistor R3 may show the same resistance change rate. Simultaneously, the resistance change rate of the first resistor R1 and the fourth resistor R4 may be different from the resistance change rate of the second resistor R2 and the third resistor R3. That is, the first resistor R1 and the fourth resistor R4 may have a first resistance change rate, the second resistor R2 and the third resistor R3 may have a second resistance change rate, and the first resistance change rate may be different from the second resistance change rate.

Further, as shown in FIG. 5, the first switch unit 350 may include a first transistor Q1 and a second transistor Q2. The first transistor Q1 and the second transistor Q2 may be bipolar transistors, field effect transistors, or any other components having a similar switch function.

For example, the first transistor Q1 and the second transistor Q2 may be bipolar junction transistors (BJT), namely, bipolar transistors. The first end 351 (i.e., emitting electrode) of the first transistor Q1 may be electrically connected to the first output terminal 231 of the bridge-type strain sensor, the second end 353 (i.e., collecting electrode) of the first transistor Q1 may be electrically connected to the first common output line 310. The first end 352 (i.e., emitting electrode) of the second transistor Q2 may be electrically connected to the second output terminal 232 of the bridge-type strain sensor, and the second end 354 (i.e., emitting electrode) of the second transistor Q2 may be electrically connected to the second common output line 320 of the bridge-type strain sensor. A control terminal 356 (i.e., base electrode) of the first transistor Q1 and a control terminal 357 (i.e., base electrode) of the second transistor Q2 may be electrically connected to form a first control terminal 355 that is configured to receive the first control signal Gn.

In one embodiment, the first control signal Gn may be outputted from the output terminal of the nth gate electrode driving unit of the gate electrode driving circuit in the display panel, and the output terminal of the nth gate electrode driving unit may be electrically connected to the first control terminal of the first switch unit. In another embodiment, the first control signal Gn may be from other control circuit inside or outside the display panel as long as the disclosed control circuit may time-sharingly switch on each bridge-type strain sensor according to a series of timing output pulse signals.

Figure 6:
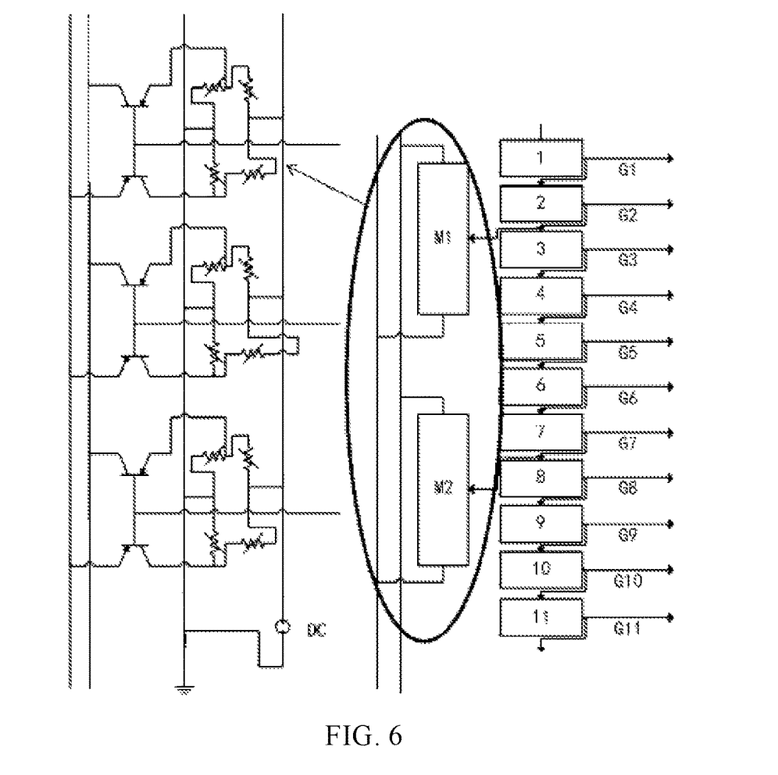
FIG. 6 illustrates an exemplary circuit diagram showing an arrangement of bridge-type strain sensors in FIG. 5 consistent with disclosed embodiments.

FIG. 6 illustrates a circuit diagram showing an arrangement of bridge-type strain sensors. As shown in FIG. 6, the first control terminal of the first switch unit in the bridge-type strain sensor (i.e., the bridge-type strain sensor M) may be electrically connected to an output terminal G2 of an ith gate driving control unit (e.g., i equals to 2), and the first control terminal of the first switch unit of at least one other bridge-type strain sensor (i.e., the bridge-type strain sensor M+1) may be electrically connected to an output terminal G7 of a jth gate electrode driving unit (e.g., j equals to 7). Both i and j are positive integers, i does not equal to j, and both i and j are smaller than or equal to n.

In one embodiment, as shown in FIG. 6, i and j (i.e., i=2, and j=7) may be separately disposed. That is, the first control terminals of two adjacent bridge-type strain sensors may be connected to the output terminals of two nonadjacent gate electrode driving units. In some other embodiment, i and j may be neighboring values, for example, the first control terminal of the bridge-type strain sensor M may be electrically connected to an output terminal of a 4th gate electrode driving unit, the first control terminal of bridge-type strain sensor M+1 may be electrically connected to an output terminal of a 5th gate electrode driving unit. In other embodiments, the output terminals of the gate electrode driving units electrically connected by the first control terminals of two adjacent bridge-type strain sensors may be disposed with equal time interval, or may be disposed with unequal time intervals.

For example, a first control terminal of a first bridge-type strain sensor may be electrically connected to an output terminal of a first gate electrode driving unit, a first control terminal of a second bridge-type strain sensor may be electrically connected to an output terminal of a third gate electrode driving unit, and a first control terminal of a third bridge-type strain sensor may be electrically connected to an output terminal of an 8th gate electrode driving unit as long as the detection circuit that calculates the touch-control force of the display panel can identify the switched-on bridge-type strain sensor at a corresponding timing sequence.

Figure 7:
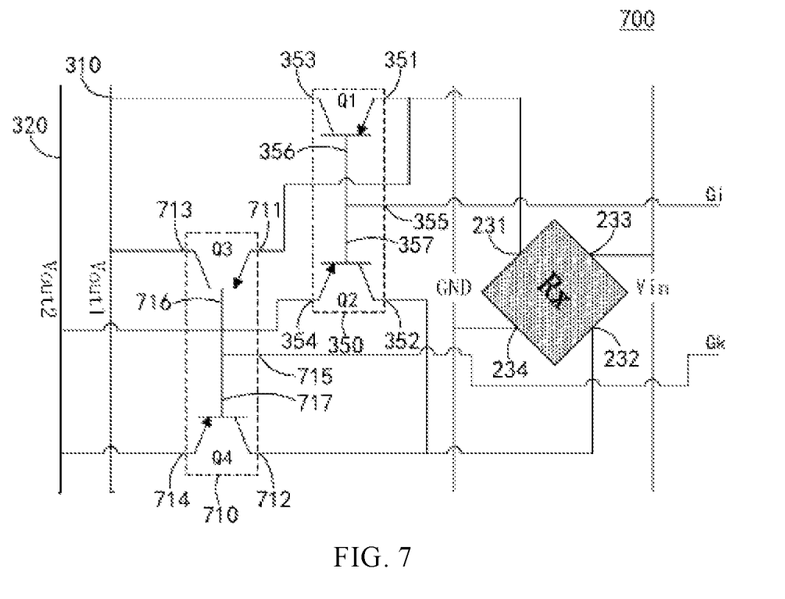
FIG. 7 illustrates another exemplary type of bridge-type strain sensors in a display panel included in a mobile communication device in FIG. 1 consistent with disclosed embodiments.

FIG. 7 illustrates an exemplary bridge-type strain sensor in a display panel included in a mobile communication device. As shown in FIG. 7, a bridge-type strain sensor 700 may also include a second switch unit 710. The second switch unit 710 may include a second control terminal 715, and the second control terminal 715 may receive a second control signal Gk to control the switch-on and switch-off of the first output terminal 231 and the second output terminal 232, respectively.

The first control terminal 355 of the first switch unit 350 in the bridge-type strain sensor may be electrically connected to the output terminal Gi of the ith gate electrode driving unit. The second control terminal 715 of the second switch unit 710 in the bridge-type strain sensor may be electrically connected to the output terminal Gk of the kth gate electrode driving unit, where k is a positive integer not equal to i but may be smaller than or equal to n.

In one embodiment, the second switch unit 710 may include a third transistor Q3 and a fourth transistor Q4 (i.e., bipolar transistor). Specifically, a first end 711 (i.e., emitting electrode) of the third transistor Q3 may be electrically connected to the first output terminal 231 of the bridge-type strain sensor, and a second end 713 (i.e., collecting electrode) of the third transistor Q3 may be electrically connected to the first common output line 310 of the bridge-type strain sensor. A first end 712 (i.e., collecting electrode) of the fourth transistor Q4 may be electrically connected to the second output terminal 232 of the bridge-type strain sensor, and a second end 714 (i.e., emitting electrode) of the fourth transistor may be electrically connected to the second common output line 320 of the bridge-type strain sensor. A control terminal 716 of the third transistor Q3 and a control terminal 717 of the fourth transistor Q4 may be electrically connected to form a second control terminal 715, and the second control terminal 715 may be electrically connected to the output terminal Gk of the kth gate electrode driving unit, where k is a positive integer not equal to i, and k may be smaller than or equal to n. The third transistor Q3 and the first transistor Q1 may be connected in parallel, and the second transistor Q2 and the fourth transistor Q4 may be connected in parallel. The switch-on and switch-off of the first output terminal 231 and the second output terminal 232 may be controlled by the first switch unit 350 and the second switch unit 710.

In one embodiment, k and i may be separately disposed. For example, k may be an output terminal G5 of the 5th gate electrode driving unit, and i is the output terminal G2 of a 2nd gate electrode driving unit. G2 and G5 may be time-sharingly switched on to read an output signal of the bridge-type strain sensor twice in a same location.

In one embodiment, k and i may be disposed next to each other. For example, k is an output terminal G6 of a 6th gate electrode driving unit, and i is the output terminal G7 of a 7nd gate electrode driving unit. G6 and G7 may be time-sharingly switched on to extend a single access time for an output signal of the bridge-type strain sensor in a certain location.

As shown in FIG. 7, a plurality of switch units may be arranged in parallel and disposed in any bridge-type strain sensor to extend a single scanning time of a single sensor when detecting a touch-control force, or to read the output signal of the same sensor for multiple times.

As shown in FIG. 7, two groups of output switches of the bridge-type strain sensor (Q1 and Q2 may be a first group, and Q3 and Q4 may be a second group) may be connected to the output terminals of two adjacent or non-adjacent GIP circuits. Such arrangement is used for illustrative purpose. In some other embodiments, a plurality of switch components (greater than or equal to 2) may be disposed in the switch component in the bridge-type strain sensor, and the plurality of switch components may be connected in parallel between the first output terminal 231, the second output terminal 232, the first common output line 310, and the second common output line 320. Further, the plurality of switch components may be connected to output terminals of different GIP circuits, respectively, to extend the signal read access time of the output signal of the bridge-type strain sensor in a certain location or read the output signal of the bridge-type strain sensor in the same location.

In one embodiment, the first common output line 310 and the second common output line 320 may be electrically connected to a detection circuit. The detection circuit may be configured to obtain the output signal of the bridge-type strain sensor according to the difference in voltages outputted from the first common output line 310 and the second common output line 320. Specifically, a force applied on the display panel or pixel array may be calculated by receiving the measurement value of the resistance change detected by the bridge-type strain sensors.

In some embodiments, the bridge-type strain sensor may be configured to be adjustable in a timing sequence. When the detection circuit read an output signal of a certain sensor, other sensors with output signals not being read may connect to the ground. Accordingly, a power consumption of the display panel may be lowered by not applying an external and continuous voltage to all sensors.

In one embodiment, a bridge may have two driving input terminals Vin and GND, two output terminals Vout1 and Vout2, and an output voltage Vout=Vout2−Vout1. The first output terminal 231 and the second output terminal 232 may be connected to two output buses via two semiconductor switches, respectively. The base electrodes (bipolar transistors) or the gate electrodes (field effect transistor) of two semiconductor switches may be shorted out and be connected to an output of a certain level shift register in a GIP circuit. The bridge-type strain sensor may be labeled as M, and may share two output buses. Further, the output signal of a certain level or multi-level GIP circuit may be treated as a control signal of a switch that outputs a strain. The bridge-type strain sensor may work simultaneously with the GIP circuit. When reading a signal according to the switch order in the GIP circuit, the bridge-type strain sensor in a corresponding location may output the voltage to the two shared output buses. The system may detect the difference in voltages outputted by an output bus circuit to obtain output signal of the bridge-type strain sensor in a corresponding sequence to calculate the touch-control force.

The detection circuit may be connected to a bridge-type strain sensor array, and be configured to determine the resistance change detected by a certain sensor in the array. Based on the resistance change detected by each certain sensor and the arrangement of the sensors, the detection circuit may determine a touch-control location of a force applied on the pixel array 220.

If a more accurate measurement is required, the measurement of the force may be calibrated according to capacitive touch sensors in the display panel. If a user uses a finger to apply a force on a certain area of the display panel, different portions of the display panel may have different strains. For example, if a user touches an area close to the edge of the display panel or close to the bridge-type strain sensor in the display panel, a strain may have a higher value than the strain induced by touching an area far from the bridge-type strain sensor in the display panel. Based on a possible existence of calibration matrix in the touch-control location, a certain touch-control location may be applied to calibrate the measurement of the force.

The disclosed mobile communication device may include a plurality of sensor arrangements. A detection circuit may select certain sensors based on an expected sensitivity. For example, the detection circuit may be implemented in a process logic, or used as a processor, a micro-processor, or an application specific integrated circuit (ASIC), or a field programmable gate array (FPGA) in an input device.

In one embodiment, the disclosed detection circuit may be connected to a response circuit. The response circuit may be configured to generate a dynamic response based on the applied force calculated by the detection circuit.

A specific action or a series of actions launched by the response circuit in respond to a detected resistance change in the bridge-type strain sensor may be pre-determined and configured by the user during a fabrication process. Or the specific action or the series of actions may rely on applications executed by mobile communication devices. The response circuit may be configured to launch a plurality of actions. Each action may be executed according to different ranges of resistance change detected by the bridge-type strain sensors. The response circuit may be configured to detect resistance change to control the strength of action or may include a plurality of objects in a certain action. The response circuit may be implemented in the process logic 120, as shown in FIG. 1. Or, the response circuit may be treated as a processor, a micro-processor, an application specific integrated circuit (ASIC), or a field programmable gate array (FPGA) for implementation.

Figure 8:
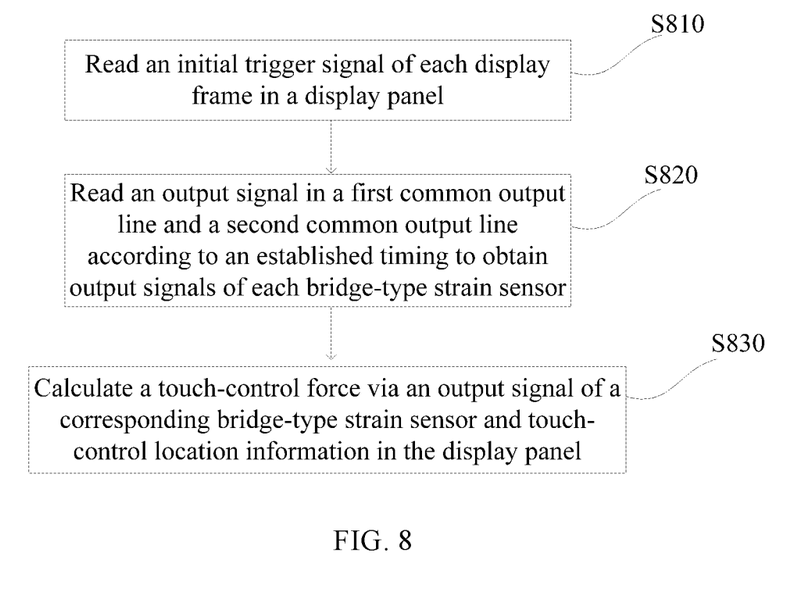
FIG. 8 illustrates an exemplary touch-control force detection method consistent with disclosed embodiments.

FIG. 8 illustrates an exemplary flow chart of a touch-control force detection method. As shown in FIG. 8, the touch-control force detection method may be applied in the display panel containing a display area and a non-display area surrounding the display area. The display panel may include a plurality of bridge-type strain sensors. The bridge-type strain sensor may include a first output terminal, a second output terminal, a first input terminal, a second input terminal, and a first switch unit.

The first output terminal may be electrically connected to the first common output line, the second output terminal may be electrically connected to the second common output line, the first input terminal may be electrically connected to the first power supply voltage, and the second input terminal may be electrically connected to the second power supply voltage. The first end, the second end, the third end, and the fourth end of the first switch unit may be electrically connected to the first output terminal, the second output terminal, the first common output line, and the second common output line, respectively. The first control terminal of the first switch unit may receive the first control signal to control the switch-on and switch-off of the first output terminal and the second output terminal.

As shown in FIG. 8, an initial trigger signal of each display frame in the display panel may be read in (S810). According to an established timing sequence, the output signal in the first common output line and the second common output line may be read out to obtain the output signal of each bridge-type strain sensor (S820). The touch-control force may be calculated via the output signal of a corresponding bridge-type strain sensor and the touch-control location detected in the display panel (S830).

Figure 9:
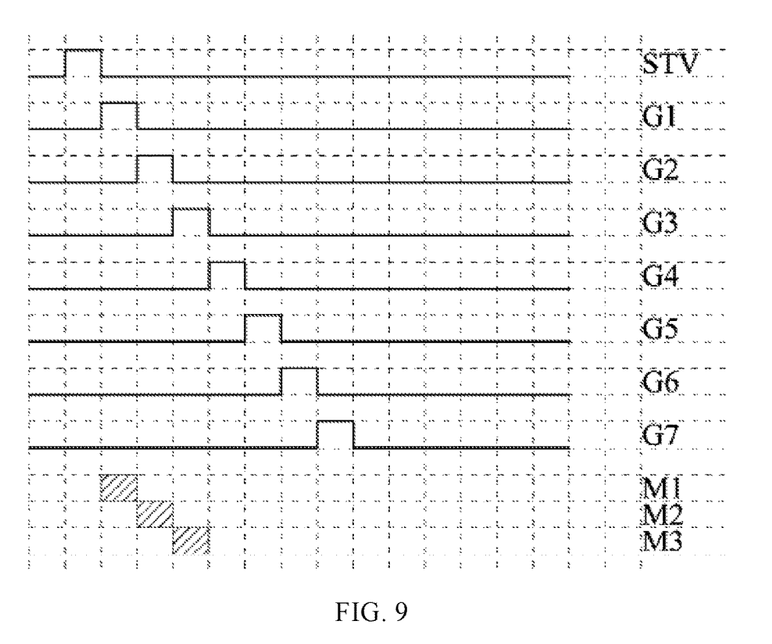
FIG. 9 illustrates an exemplary timing diagram of a touch-control detection method in FIG. 8 consistent with disclosed embodiments.

FIG. 9 illustrates an exemplary timing sequence of a touch-control detection method. As shown in FIG. 9, by reading in the trigger signal STV of each image frame, the first control terminals of the first switch units in bridge-type strain sensors M1, M2 and M3 may receive a first control signal G1, G2, and G3, respectively, to control switch-on and switch-off of the first output terminal and the second output terminal. Specifically, the first control terminal of the first switch unit in the bridge-type strain sensor M1 may be electrically connected to the first control signal G1, the first control terminal of the first switch unit in the bridge-type strain sensor M2 may be electrically connected to the first control signal G2, and the first control terminal of the first switch unit in the bridge-type strain sensor M3 may be electrically connected to the first control signal G3. Each output may be sequentially read out according to the preset time intervals, and the output signal obtained according to the timing sequence may be matched with bridge-type strain sensors in different locations.

In one embodiment, a plurality of control signals, from the first control signal G1 to the seventh control signal G7, may be seven adjacent output terminals of the gate electrode driving units in the GIP circuit in the display panel. In another embodiment, the plurality of control signals, from the first control signal G1 to the seventh control signal G7, may be an individual pulse signal outputted by a control circuit to control the switch-on and switch-off of the output terminal of the corresponding bridge-type strain sensor.

As shown in FIG. 9, two adjacent bridge-type strain sensors (M1 and M2, or M2 and M3) may be sequentially switched on according to the continuous timing sequence. In another embodiment, the adjacent two bridge-type strain sensors may be discontinuously switched on, or the same bridge-type strain sensors may be continuously switched on to continuously read out the output signal of the bridge-type strain sensor in the same location, or extend the output signal of a certain or a plurality of certain bridge-type strain sensors at a single time period.

Figure 10:
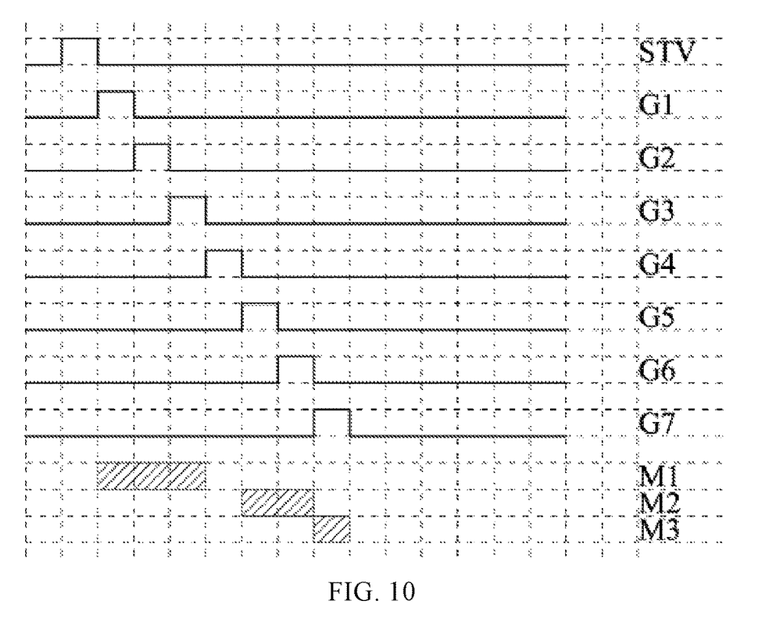
FIG. 10 illustrates another exemplary timing diagram of a touch-control detection method in FIG. 8 consistent with disclosed embodiments.

FIG. 10 illustrates another exemplary timing sequence of a touch-control detection method. As shown in FIG. 10, by reading in the trigger signal STV of each frame image, the bridge-type strain sensor M1 may include a first switch unit, a second switch unit, and a third switch unit. The first switch unit, the second switch unit, and the third switch unit of the bridge-type strain sensor may be connected in parallel to each other between the first common output terminal, the second common output line, and the first output line, the second output line of the bridge-type strain sensor M1. The first control terminal of the first switch unit in the bridge-type strain sensor M1 may receive the first control signal G1, the second control terminal of the second switch unit may receive the second control signal G2, and the third control terminal of the third switch unit may receive the third control signal G3, to control the switch-on and switch-off of the first output terminal and the second output terminal of the bridge-type strain sensor M1, thus reading out the output signal of the bridge-type strain sensor in the same location for three consecutive pulses.

The bridge-type strain sensor M2 may include a first switch unit and a second switch unit. The first switch unit and the second switch unit of the bridge-type strain sensor M2 may be connected in parallel to each other between the first common output line, the second common output line, and the first output terminal, the second output terminal of the bridge-type strain sensor M2. The first control terminal of the first switch unit in the bridge-type strain sensor M2 may receive a fifth control signal G5, the second control terminal of the second switch unit may receive a sixth control signal G6 to control the switch-on and switch-off of the first output terminal and the second output terminal of the bridge-type strain sensor M2.

The first bridge-type strain sensor M1 may be read one pulse after the second bridge-type strain sensor M2, and the number of pulses between two adjacent bridge-type strain sensors is only for illustrative purpose only, and may not intend to limit the scope of the present disclosure. Each two adjacent bridge-type strain sensors may be disposed with the same time interval, or with different time intervals.

The bridge-type strain sensor M3 may include a first switch unit, and a first control terminal of the first switch unit in the bridge-type strain sensor M3 may receive the seventh control signal G7 to control the switch-on and switch-off of the first output terminal and the second output terminal of the bridge-type strain sensor M3. The output signal obtained according to the timing sequence may be matched with bridge-type strain sensors in different locations. In another embodiment, a plurality of parallel switch units in the same bridge-type strain sensor may receive non-continuous control signals to read out the output signal in the same location for multiple times.

Figure 11:
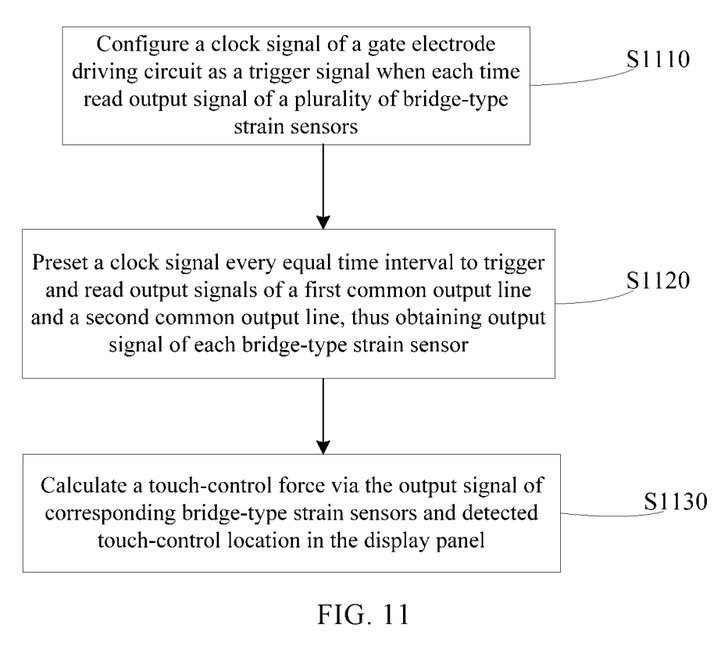
FIG. 11 illustrates an exemplary touch-control force detection method consistent with disclosed embodiments.

FIG. 11 illustrates an exemplary touch-control force detection method. As shown in FIG. 11, the touch-control force detection method may be applied in the display panel. The touch-control force detection method may be applied in the display panel including a display area, a non-display area surrounding the display area, and a plurality of bridge-type strain sensors. The bridge-type strain sensor may include a first output terminal, a second output terminal, a first input terminal, a second input terminal, and a first switch unit.

The first output terminal may be electrically connected to the first common output line, the second output terminal may be electrically connected to the second common output line, the first input terminal may be electrically connected to the first power supply voltage, and the second input terminal may be electrically connected to the second power supply voltage. The first end, the second end, the third end, and the fourth end of the first switch unit may be electrically connected to the first output terminal, the second output terminal, the first common output line, and the second common output line. The first control terminal of the first switch unit may receive the first control signal to control the switch-on and switch-off of the first output terminal and the second output terminal.

The disclosed display panel may also include gate electrode lines, pixel units, and gate electrode driving circuit. The gate electrode lines may be sequentially arranged along a first direction, the data lines may sequentially arranged along a second direction. The pixel unit may be defined by intersected gate electrode lines and data lines. The gate electrode driving circuit may include the nth level gate electrode driving unit, and the gate electrode driving unit in each level may include an output terminal electrically connected to the disclosed gate electrode lines. Further, the output terminal of at least one gate electrode driving unit may be electrically connected to the first control terminal of the disclosed first switch unit.

As shown in FIG. 11, a clock signal of the gate electrode driving circuit may be treated as the trigger signal that reads out the output signal of a plurality of bridge-type strain sensors (S1110). For every other time interval, a clock signal may be preset to trigger and read out the output signals of the first common output line and the second common output line to obtain the output signal of each bridge-type strain sensor (S1120). The touch-control force may be calculated via the output signal of the corresponding bridge-type strain sensor and the detected touch-control location information in the display panel (S1130).

Figure 12:
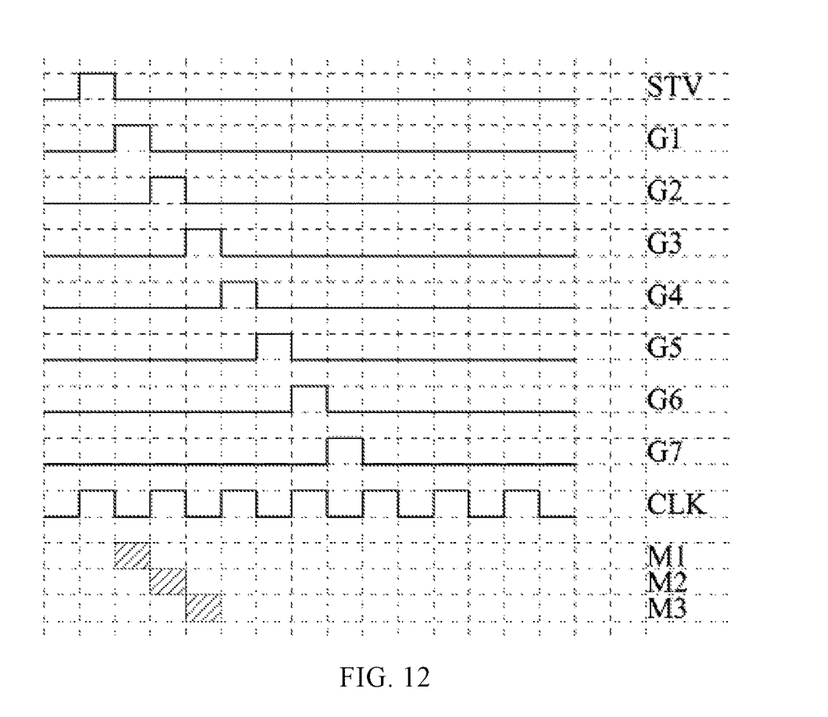
FIG. 12 illustrates another exemplary timing diagram of a touch-control detection method consistent with disclosed embodiments.

FIG. 12 illustrates another exemplary timing sequence of a touch-control detection method indicated in FIG. 11. As shown in FIG. 12, timing sequence signals such as CLK may be trigger signals and, in every time interval following STV, the output signal is read out for every several CLK trigger signals or cycles. The first control terminals of each first switch unit in the bridge-type strain sensor M1, M2 and M3 may receive the first control signal G1, G2, and G3, respectively, to control the switch-on and switch-off of the first output terminal and the second output terminal. Specifically, the first control terminal of the first switch unit in the bridge-type strain sensor M1 may be electrically connected to the first control signal G1, the first control terminal of the first switch unit in the bridge-type strain sensor M2 may be electrically connected to the first control signal G2, and the first control terminal of the first switch unit in the bridge-type strain sensor M3 may be electrically connected to the first control signal G3, thus realizing the sequential output of each bridge-type strain sensor.

In one embodiment, the plurality of control signals, from the first control signal G1 to the seventh control signal G7, may be seven adjacent output terminals of the gate electrode driving units in the GIP circuit in the display panel. In another embodiment, the plurality of control signals, from the first control signal G1 to the seventh control signal G7, may be an individual pulse signal outputted by a control circuit to control the switch-on and switch-off of the output terminal of the corresponding bridge-type strain sensor.

Figure 13:
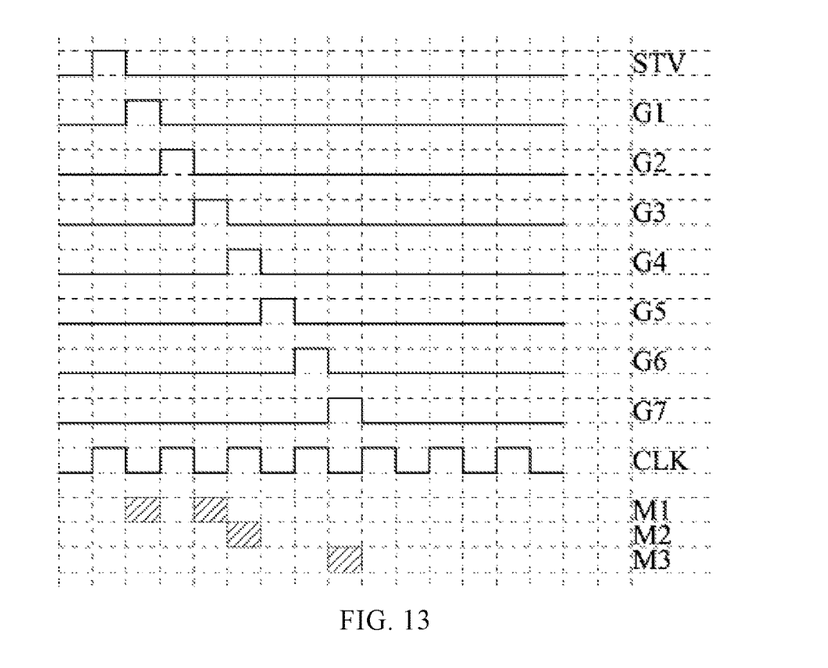
FIG. 13 illustrates another exemplary timing diagram of a touch-control detection method consistent with disclosed embodiments.

FIG. 13 illustrates another exemplary timing sequence of the touch-control detection method indicated in FIG. 11. As shown in FIG. 13, each two adjacent bridge-type strain sensors may be sequentially and continuously switched on. In another embodiment, each two adjacent bridge-type strain sensors may be sequentially and discontinuously switched on.

For example, in FIG. 13, the bridge-type strain sensor M1 may include a first switch unit and a second switch unit. The first switch unit and the second switch unit in the bridge-type strain sensor M1 may be connected in parallel between the first common output line, the second common output line, and the first output terminal and the second output terminal of the bridge-type strain sensor M1. The first control terminal of the first switch unit in the bridge-type strain sensor M1 may receive the first control signal G1, the second control terminal of the second switch unit in the bridge-type strain sensor M1 may receive the third control signal G3 to control the switch-on and switch-off of the first output terminal and the second output terminal of the bridge-type strain sensor M1 to twice read the output signal of the same bridge-type strain sensor. The specific number of times for reading out the output signals may be configured according to the system requirement.

The first control terminals of each first switch unit in the bridge-type strain sensor M2 and M3 may receive the first control signal G4 and G7, respectively, to control the switch-on and switch-off of the first output terminal and the second output terminal. In another embodiment, as shown in FIG. 10, a certain or a plurality of bridge-type strain sensors may include two or more than two switch units connected in parallel, and the switch units connected in parallel may receive the continuous control signal to extend the access time for the output signal of the same bridge-type strain sensor.

In another embodiment, each two adjacent bridge-type strain sensors may be sequentially and discontinuously switched-on with the same time interval. For example, the timing sequence signal CLK may be the trigger signal in each time interval or cycle, and the output signal may be read out for every plurality of CLK trigger signals after STV. The first control terminals of each first switch unit in the bridge-type strain sensors M1, M2 and M3 may receive the first control signals G1, G4 and G7, respectively, to control the switch-on and switch-off of the first output terminal and the second output terminal.

Specifically, the first control terminal of the first switch unit in the bridge-type strain sensor M1 may be electrically connected to the first control signal G1, the first control terminal of the first switch unit in the bridge-type strain sensor M2 may be electrically connected to the first touch signal G4, the first control terminal of the first switch unit in the bridge-type strain sensor M3 may be electrically connected to the first control signal G7, to sequentially obtain the output of each bridge-type strain sensor. In other embodiments, each two adjacent bridge-type strain sensors may be read out sequentially with different time intervals. For example, the first control terminals of each first switch unit in the bridge-type strain sensors M1, M2 and M3 may receive the first control signals G1, G3 and G7, respectively.

The disclosed display panel and touch-control force detection method may realize the scanning operation mode of the bridge-type strain sensor via the shift register function of a GIP circuit. The output signal of each sensor may be read in a time-multiplexed way according to the gate electrode scanning signal displayed on a display panel to largely reduce the number of wirings without increasing the frame width. The reduction in the number of wirings may realize the miniaturization of sensors. Under the condition that the frame area of the display panel is fixed, more sensors may be disposed in the frame, thus improving the sensitivity of the force sensing. The sensors may also be disposed in the non-display area of the display panel without influencing related circuit inside the display area. The switches may be connected in parallel to adjust the scanning time period of touch-control force detection using a single sensor.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display panel, comprising:
   a display area;
   a non-display area surrounding the display area; and
   a plurality of bridge-type strain sensors disposed in the non-display area of the display panel, the bridge-type strain sensor further comprising:
   a first output terminal electrically connected to a first common output line;
   a second output terminal electrically connected to a second common output line;
   a first input terminal electrically connected to a first power supply voltage;
   a second input terminal electrically connected to a second power supply voltage; and
   a first switch unit,
   wherein a first end, a second end, a third end, and a fourth end of the first switch unit are electrically connected to the first output terminal, the second output terminal, the first common output line, and the second common output line, respectively, and a first control terminal of the first switch unit receives a first control signal to control switch-on and switch-off of the first output terminal and the second output terminal.

2. The display panel according to claim 1, wherein:
   the bridge-type strain sensor is a Wheatstone bridge comprising a first resistor, a second resistor, a third resistor, and a fourth resistor, and
   the first resistor and the second resistor are connected at the first input terminal, the third resistor and the fourth resistor are connected at the second input terminal, the first resistor and the third resistor are connected at the first output terminal, and the second resistor and the fourth resistor are connected at the second output terminal.

3. The display panel according to claim 1, wherein the bridge-type strain sensor is a silicon-based MEMS strain sensor.

4. The display panel according to claim 1, wherein:
   the first switch unit comprises a first transistor and a second transistor,
   a first end of the first transistor is electrically connected to the first output terminal of the bridge-type strain sensor, a second end of the first transistor is electrically connected to the first common output line, a first end of the second transistor is electrically connected to the second output terminal of the bridge-type strain sensor, a second end of the second transistor is electrically connected to the second common output line of the bridge-type strain sensor, and a control terminal of the first transistor and a control terminal of the second transistor are connected to form the first control terminal configured to receive the first control signal.

5. The display panel according to claim 1, further comprising:
   gate electrode lines sequentially arranged along a first direction;

data lines sequentially arranged along a second direction;
pixel units defined by intersected gate electrode lines and the data lines; and
a gate electrode driving circuit including gate electrode driving units from level 1 to level n, wherein the gate electrode driving unit in each level comprises an output terminal that is electrically connected to gate electrode lines and n is an integer greater than or equal to 2.

6. The display panel according to claim 5, wherein the first control terminal of the first switch unit in the bridge-type strain sensor is electrically connected to an output terminal of an ith gate electrode driving unit, and the first control terminal of the first switch unit in at least another bridge-type strain sensor is electrically connected to the output terminal of an jth gate electrode driving unit, i and j are positive integers, i does not equal to j, and both i and j are smaller than or equal to n.

7. The display panel according to claim 5, wherein at least one bridge-type strain sensor includes a second switch unit, and the second switch unit includes a second control terminal receiving a second control signal to control the switch-on and switch-off of the first output terminal and the second output terminal, respectively.

8. The display panel according to claim 7, wherein the first control terminal of the first switch unit in the bridge-type strain sensor is electrically connected to the output terminal of an ith gate electrode driving unit, the second control terminal of the second switch unit in the bridge-type strain sensor is electrically connected to the output terminal of a kth gate electrode driving unit, k is a positive integer smaller than or equal to n.

9. The display panel according to claim 8, wherein
the second switch unit comprises a third transistor and a fourth transistor,
a first end of the third transistor is electrically connected to the first output terminal of the bridge-type strain sensor, and a second end of the third transistor is electrically connected to the first common output line of the bridge-type strain sensor,
a first end of the fourth transistor is electrically connected to the second output terminal of the bridge-type strain sensor, and a second end of the fourth transistor is electrically connected to the second common output line of the bridge-type strain sensor,
a control terminal of the third transistor and a control terminal of the fourth transistor are electrically connected to form a second control terminal, and the second control terminal is electrically connected to the output terminal of the kth gate electrode driving unit, k is a positive integer smaller than or equal to n.

10. The display panel according to claim 5, wherein:
the non-display area include a first sub-area on a first side of the display area and a second sub-area on a second side relative to the first side of the display area, and
the gate electrode driving circuit is disposed in the first sub-area and the second sub-area.

11. The display panel according to claim 1, wherein the first common output line and the second common output line are electrically connected to a detection circuit, and the detection circuit is configured to output a difference in voltages between the first common output line and the second common output line to obtain an output signal of the bridge-type strain sensor.

12. A touch-control force detection method used in the display panel containing a display area, a non-display area surrounding the display area, and a plurality of bridge-type strain sensors disposed in the non-display area of the display panel, the bridge-type strain sensor further including a first output terminal electrically connected to a first common output line; a second output terminal electrically connected to a second common output line; a first input terminal electrically connected to a first power supply voltage; a second input terminal electrically connected to a second power supply voltage; and a first switch unit, wherein a first end, a second end, a third end, and a fourth end of the first switch unit are electrically connected to the first output terminal, the second output terminal, the first common output line, and the second common output line, respectively, and a first control terminal of the first switch unit receives a first control signal to control switch-on and switch-off of the first output terminal and the second output terminal, the method comprising:
reading an initial trigger signal of each display frame in the display panel;
reading an output signal in the first common output line and the second common output line according to an established sequence to obtain an output signal of each bridge-type strain sensor;
calculating a touch-control force via the output signal of corresponding bridge-type strain sensors and the detected touch-control location in the display panel.

13. The touch-control force detection method according to claim 12, wherein the display panel further comprises gate electrode lines sequentially arranged along a first direction; data lines sequentially arranged along a second direction; pixel units defined by intersected gate electrode lines and data lines; and a gate electrode driving circuit including gate electrode driving units from level 1 to level n, wherein the gate electrode driving unit in each level comprises an output terminal that is electrically connected to gate electrode lines, n is an integer greater than or equal to 2, the method further comprising:
setting a clock signal of the gate electrode driving circuit as the trigger signal each time to read the output signal of a plurality of bridge-type strain sensors;
presetting a clock signal every time interval to trigger and read the output signal in the first common output line and the second common output line to obtain the output signal of each bridge-type strain sensor;
calculating the touch-control force via the output signal of the corresponding bridge-type strain sensor and detected touch-control location information in the display panel.

* * * * *